(12) United States Patent
Wu et al.

(10) Patent No.: US 12,325,899 B2
(45) Date of Patent: Jun. 10, 2025

(54) HEAT TREATABLE TITANIUM ALLOY

(71) Applicant: MONASH UNIVERSITY, Clayton (AU)

(72) Inventors: Xinhua Wu, Clayton (AU); Xigen Zhou, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 0 days.

(21) Appl. No.: 16/753,480

(22) PCT Filed: Oct. 8, 2018

(86) PCT No.: PCT/AU2018/051082
§ 371 (c)(1),
(2) Date: Apr. 3, 2020

(87) PCT Pub. No.: WO2019/068148
PCT Pub. Date: Apr. 11, 2019

(65) Prior Publication Data
US 2020/0291502 A1    Sep. 17, 2020

(30) Foreign Application Priority Data
Oct. 6, 2017    (AU) ................. 2017904043

(51) Int. Cl.
*C22C 14/00*    (2006.01)
*C22F 1/18*    (2006.01)
*F16B 31/06*    (2006.01)

(52) U.S. Cl.
CPC .............. *C22C 14/00* (2013.01); *C22F 1/183* (2013.01); *F16B 31/06* (2013.01)

(58) Field of Classification Search
CPC ......... B33Y 70/00; C22C 14/00; C22F 1/183; F16B 31/06
(Continued)

(56) References Cited

U.S. PATENT DOCUMENTS 5,014,769 A    5/1991    El-Kaddah et al.
5,068,003 A    11/1991    Takahashi et al.
(Continued)

FOREIGN PATENT DOCUMENTS

| GB | 782564 A | 9/1957 |
|---|---|---|
| WO | 2016/114956 A1 | 7/2016 |
| WO | 2017/018517 A1 | 2/2017 |

OTHER PUBLICATIONS

Examination Report No. 1 dated Oct. 29, 2020 for corresponding Australian Application No. 2018344767,7 pages.
(Continued)

*Primary Examiner* — Jie Yang
(74) *Attorney, Agent, or Firm* — MH2 Technology Law Group, LLP

(57) ABSTRACT

A "modified" meta-stable #titanium alloy that, apart from carbon content, corresponds to the composition range for standard Beta-C titanium alloy. The modified alloy comprises vanadium, chromium, molybdenum, zirconium, aluminium, with maxima for oxygen, iron, nitrogen, hydrogen, yttrium, and other elements (apart from carbon and titanium), with a balance (apart from carbon) of titanium. The modified alloy has carbon present at a stable total carbon level sufficiently in excess of 0.05 wt. % achieving an improvement in the mechanical properties of UTS, DSS and fatigue strength in threaded regions, relative to standard Beta-C alloy with a specified carbon level below 0.05 wt. %, with a maximum carbon content controlled so as to preclude carbide formation having a detrimental effect on the level of fatigue strength.

19 Claims, 1 Drawing Sheet

Comparison of β-Phase Grain Size for Invention Alloy & Standard Beta-C Alloy

(a) Alloy of the Invention (b) Standard Beta-C Alloy

(58) Field of Classification Search
USPC .......................................................... 420/420
See application file for complete search history.

(56) References Cited

U.S. PATENT DOCUMENTS

| | | | |
|---|---|---|---|
| 5,201,967 | A | 4/1993 | Schutz et al. |
| 10,913,242 | B2 * | 2/2021 | Kunieda ............ B23K 15/0046 |
| 2003/0086772 | A1 | 5/2003 | Giannakakos |
| 2003/0168138 | A1 | 9/2003 | Marquardt |
| 2016/0060742 | A1 * | 3/2016 | Yan .......................... C22C 14/00 |
| | | | 148/501 |
| 2016/0201165 | A1 * | 7/2016 | Foltz, IV ................. C22C 14/00 |
| | | | 72/379.2 |
| 2018/0200766 | A1 | 7/2018 | Kunieda et al. |

OTHER PUBLICATIONS

International Search Report and Written Opinion dated Nov. 8, 2018 from International Application No. PCT/AU2018/051082 (Authorised officer, Alex Simmons), 9 pages.

Cotton et al., "State of the Art in Beta Titanium Alloys for Airframe Applications", The Minerals, Metals & Materials Society, 2015, vol. 67, No. 6, pp. 1281-1303.

RMI Titanium Company, "Titanium Alloy Guide", RTI International Metals, Inc. Company, 2000, pp. 1-45.

Chen et al., "Effect of carbon additions on microstructure and mechanical properties of Ti-15-3", Materials Science and Technology, March 20024, vol. 20, pp. 343-349.

Chen et al., "Influence of 0.2wt-% C on the aging response of Ti-15-3", Materials Science and Technology, Jun. 2004, vol. 20, pp. 756-764.

Chu et al., "Influence of carbon on aging response and tensile properties of eutectoid beta titanium alloy Ti—13Cr", Materials Science and Technology, Jun. 2006, vol. 22, No. 6, pp. 661-666.

Chu et al., "Effect of Carbon on Microstructure and Mechanical Properties of a Eutectoid Beta Titanium Alloy", Rare Metal Materials and Engineering, Feb. 2006, vol. 35, Suppl. 1, pp. 220-224.

Hu et al., "Precipitation in carbon-doped Ti—15V—3Cr—3Sn—3Al", Rare Metal Materials and Engineering, Feb. 2006, vol. 35, Suppl. 1, pp. 225-229.

Wu et al., "Analytical Electron Microscopy of C-free and C-containing Ti-15-3", Acta Materialia, 2006, vol. 54, Issue 20, pp. 5433-5448.

Extended European Search Report dated Aug. 17, 2021 for corresponding European Application No. 18863911.6, 8 pages.

Piwonka et al., "Induction Melting and Casting of Titanium Alloy Aircraft Components", Technical Report AFML-TR-72-16C, Jul. 31, 1972, pp. 1-128.

J.G. Ferrero, "Candidate Materials for High-Strength Fastener Applications in Both the Aerospace and Automotive Industries", Journal of Materials Engineering and Performance, 2005, vol. 14, No. 6, pp. 691-696.

Carpenter Technology Technical Datasheet for Ti—3Al—8V—6Cr—4Mo—4Zr (Beta CTM), Appendix 2 to the Declaration.

Szkliniarz et al., "Carbon in Commercially Pure Titanium," Materials, 16, 711, 2023, 16 pages.

Zhao et al., "Trace Carbon in Biomedical Beta-Titanium Alloys: Recent Progress," JOM: Minerals, Metals & Materials Society, 67(10), 2015, 8 pages.

Kun Zhang et al."Achieving ultra-high strength rapidly in Ti—3Al—8V—6Cr—4Mo—4Zr alloy processed by directed energy deposition," Materials & Design, vol. 224, 111325, pp. 1-12, available online Oct. 31, 2022.

Jihoon Jeong et al., "Cooling rate measurement in directed energy deposition using photodiode-based planck thermometry (PDPT)," Additive Manufacturing Letters, vol. 3, 100101, 2022 (6 pages).

Matthew J. Donachie, Jr., "Titanium A Technical Guide Second Edition," ASM International, The Materials Information Society, Appendix J, Glossary Dec. 2000 (4 pages).

Hideo Mizukami et al., "Solidification Behavior of Ti—6Al—4V Alloy," ISIJ International, vol. 60, pp. 2455-2461 (2020).

* cited by examiner

Comparison of β-Phase Grain Size for Invention Alloy & Standard Beta-C Alloy

(a) Alloy of the Invention  (b) Standard Beta-C Alloy

Alpha Grain Boundary Comparison for Invention Alloy & Standard Beta-C

(a) Alloy of the Invention (b) Alloy of the Invention  (b) Standard Beta-C Alloy

HEAT TREATABLE TITANIUM ALLOY

CROSS-REFERENCE TO RELATED APPLICATIONS

This application is a U.S. National Stage application of PCT/AU2018/051082 filed 8 Oct. 2018, which claims priority to Australian Application No. 2017904043 filed 6 Oct. 2017, the entire disclosures of which are hereby incorporated by reference in their entireties.

FIELD OF THE INVENTION

This invention relates to a titanium alloy composition that is heat treatable to attain enhanced physical properties, specifically levels of ultimate tensile strength (UTS) and, where relevant, double shear strength (DSS) and threaded fatigue strength.

BACKGROUND TO THE INVENTION

Currently, a range of titanium alloy components is made of Ti-6Al-4V (Ti-64), an alpha/beta titanium alloy. This mainly is the case with titanium alloy fasteners, in particular, those for aerospace applications. Fasteners of Ti-64 alloy have a diameter size limitation of less than 19.05 mm (0.75 inches), and the mechanical property levels within this diameter range are UTS 1100 MPa, DSS 655 MPa and threaded fatigue strength 440 MPa with maximum cycles reaching 130,000.

Other types of high strength titanium fasteners are fabricated from respective beta titanium alloys. The first of these is Beta-C alloy that conforms to the chemistry of Ti-3Al-8V-6Cr-4Mo-4Zr and exhibits UTS of 1240 MPa, DSS of 740 MPa and threaded fatigue strength of 471 MPa at required testing conditions. The diameter of bolts of Beta-C alloy is limited to 25.4 mm (one inch). The second beta titanium alloy conforms to the chemistry of Ti-5Al-5Mo-5V-3Cr-0.5Fe (Ti-5553), reported to have a UTS of 1309 MPa and a DSS of 779 MPa, with a tensile elongation of about 10%. However, application of fasteners of both alloy types has been limited, due to a tendency to intergranular fatigue failure in the threaded region of the fasteners, attributed to grain boundary alpha phase.

Beta titanium alloys have been proposed as prospective candidates for achieving higher strength, comparable to steel and nickel-based alloys. They generally consist of a microstructure of hexagonal close packing (HCP) small alpha phases in body centred cubic (BCC) beta phases and the main strengthening effect to the alloys is from the alpha phase precipitates. However, in beta titanium alloys, the continuous grain boundary alpha phases, non-uniform alpha precipitation, and the relatively large beta grain sizes persist as problems hampering the improvement of mechanical properties of beta titanium alloys. Particularly if a high strength state is attained, the ductility and fatigue properties of the alloys usually tend to be compromised.

Earlier work detailed in references [1] to [5] listed later herein found that minor addition of carbon to beta titanium alloys can eliminate grain boundary alpha phases, accelerate and refine alpha precipitation and refine beta grain size. These changes were found to result in significant increases in ductility and fatigue properties of the alloys, without resulting in a loss of high strength levels. The beta titanium alloys studied include burning-resistant titanium alloy Ti-35V-15Cr-0.3Si-0.1C, Ti-15-3-3 alloy (a shortened designation for Ti-15V-3Cr-3Al-3Sn) and Ti-13Cr alloy. However, this work did not extend to Beta-C titanium alloy over which the present invention seeks to provide an improved heat treatable composition enabling attainment of enhanced physical properties, specifically enhanced levels of UTS and, where relevant, DSS and fatigue strength in threaded regions.

General Description of the Invention

The present invention provides a meta-stable β titanium alloy that, apart from carbon content, typically corresponds to the composition range for standard Beta-C titanium alloy and, for ease of description, the meta-stable β alloy of the invention is herein distinguished as "modified alloy". Since its development about 50 years ago by RMI Titanium Company, standard Beta-C has found important use where very high strength is required, such as fasteners and components of landing equipment for aircraft.

As with standard Beta-C titanium alloy, the modified alloy of the invention has 7.5 to 8.5 wt. % vanadium, 5.5 to 6.5 wt. % chromium, 3.5 to 4.5 wt. % molybdenum, 3.5 to 4.5 wt. % zirconium, 3 to 4 wt. % aluminium, oxygen up to 0.14 wt. %, a maximum of 0.3 wt. % iron, nitrogen up to 0.03 wt. %, hydrogen up to 0.03 wt. %, a maximum of 50 ppm yttrium, a maximum of other elements (apart from carbon and titanium) of 0.15 wt. % each and 0.40 wt. % in aggregate in excess of 0.05 wt. % up to 0.1 wt. %, with a balance (apart from carbon) of titanium. In the standard Beta-C titanium alloy, carbon is not to exceed 0.05 wt. % and this usually is regarded as meaning less than 0.05 wt. % carbon, and typically as less than 0.02 wt. % carbon. Indeed, there is no minimum requirement for carbon in Beta-C alloy, making clear that in fact carbon is present only as an undesirable impurity that is difficult to avoid. In the modified alloy of the invention carbon is to be at a stable level in excess of 0.05 wt. %. Also, in further contrast, the present invention allows for or typically requires an intentional addition of carbon beyond the exclusion of "less than 0.05 wt. % carbon", with reference to "total carbon" in relation to the present invention designating the combined value of such residual value carbon, plus the added carbon.

In the modified alloy of the invention, the total carbon is to be sufficiently in excess of 0.05 wt. % as to achieve the required improvement in the mechanical properties of UTS, DSS and threaded fatigue strength or limit. However, the maximum total carbon content is to be controlled so as to preclude carbide formation having a detrimental effect on the level of fatigue strength. As a practical matter, the requirement for a carbon content not exceeding 0.05 wt. % in the standard Beta-C titanium alloy precludes carbon being added, other than incidentally being present in the constituents of which the standard alloy is produced. In contrast, the modified alloy of the invention usually requires an intended addition of carbon, particularly if the modified alloy is to be produced from a quantity of melted standard beta-C alloy. As indicated, total carbon is to be present at a level in excess of 0.05 wt. %, although an acceptable level is such that the total carbon does not exceed a maximum at which carbides can form and have a deleterious effect.

In seeking a stable total carbon content providing the required improvement of the mechanical properties of UTS, DSS and fatigue strength in threaded regions, while avoiding carbides forming and having a detrimental effect on the level of fatigue strength, it is found that the acceptable upper limit for total carbon can vary with the specific overall alloy composition within the lower and upper limits of the ranges for vanadium, chromium, molybdenum, zirconium, aluminium and, hence, titanium indicated for the alloy of the invention. Also, the required mechanical properties of UTS, DSS and fatigue strength in threaded regions are attained by an appropriate heat treatment regime. Additionally, the propensity for a given alloy within the limits of those ranges to accommodate a given upper limit for total carbon varies from one composition to another. That propensity varies not only with alloy composition, but also with the specific heat treatment and, in particular, with variation in the rate of cooling from a sufficiently elevated temperature. Allowing for these factors, it is found that the carbon can be added to a stable total carbon content of about 0.2 wt. %, such as to about 0.25 wt. %. Carbon in excess of 0.25 wt. % tends to result in the formation of carbides under all cooling conditions following heat treatment for all compositions, at least in the case of precipitation hardening of the δ phase enabled by heating providing solution treatment above the respective beta transus temperature for each alloy. Thus, in general, it is necessary not to exceed 0.25 wt. % total carbon in total in order to comply with the small window for the carbon addition and limit the formation of carbides having a detrimental effect on the level of fatigue strength.

As indicated, it generally is required that the total carbon content does not exceed 0.25 wt. %, to avoid carbides forming at least to an extent having a detrimental effect on the level of fatigue strength of the alloy. However, the total carbon content preferably does not exceed 0.2 wt. % in total for all alloy compositions within the lower and upper limits of the ranges for vanadium, chromium, molybdenum, zirconium, aluminium and, hence, titanium indicated for the alloy of the invention. The total carbon content also needs to be sufficiently above 0.05 wt. % in order to achieve the required improvement in the mechanical properties of UTS, DSS and fatigue strength in threaded regions. The total carbon level above 0.05 wt. % varies to an extent with alloy composition and, to allow sufficiently for this, the total carbon content generally is required to be from about 0.065 wt. % to about 0.25 wt. % and preferably from about 0.70 wt. % to about 0.20 wt. %. More preferably the total carbon content, for all alloys of the invention, is from about 0.70 wt. % to about 0.15 wt. %, such as from about 0.07 wt. % to about 0.010 wt %, and most preferably about 0.08 wt. %. The possible stable carbon content in the modified alloy of the invention may be calculated through actual experimental measurement of the volume fraction of carbide phases, if any, in a detected carbon weight percentage. Combined with microscopic analysis providing exact crystallographic data and calculated phase diagram assessment, the stable carbon content can be determined for each alloy composition. The designation of the carbon as "stable carbon" indicates carbon retained in solid solution in the predominant beta phase of the alloy, following cooling from an elevated solution heat treatment regime, as distinct from carbon that, as carbide, precipitates in the beta phase as a consequence of such cooling.

BRIEF DESCRIPTION OF THE DRAWINGS

It will be convenient now to describe the invention with reference to the accompanying Figures illustrating an embodiment of a titanium alloy of the invention. Other embodiments of the invention are possible and, consequently, the particularity of those Figures is to be understood as not superseding the generality of the overall description of the invention provided in this overall description and defined by the accompanying claims.

Where used, for example, for the manufacture of titanium fasteners, the alloy of the present invention typically undergoes a series of procedures in which it is worked or subjected to deformation such as, but not limited to, at least one process step of forging, rolling or extrusion. Thereafter the alloy typically will be subjected to a homogenizing heat treatment, before being fabricated to a required form, such as by drawing. Each of an alloy according to the invention and two standard Beta-C titanium alloys were processed similarly in that manner. Table 1 sets out the compositions of the selected alloy of the invention and shows a total carbon content of 0.101 wt. %, while the two standard Beta-C alloys had respective residual carbon contents 0.023 wt. % and 0.014 wt. %.

Figure 1:
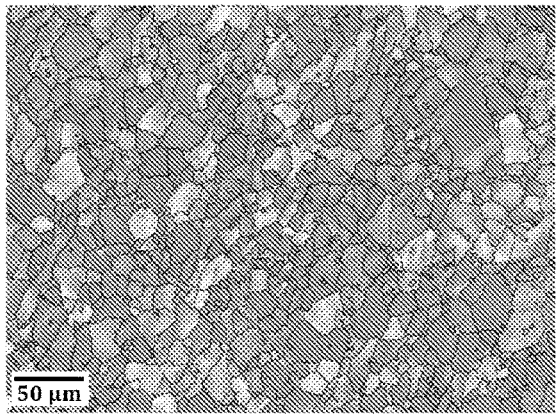
FIG. 1 provides micrographs showing the microstructure of (a) a titanium alloy of the invention compared to (b) that of a standard Beta-C alloy, in each case after the respective alloy was subjected to homogenizing heat treatment.
Figure 1:
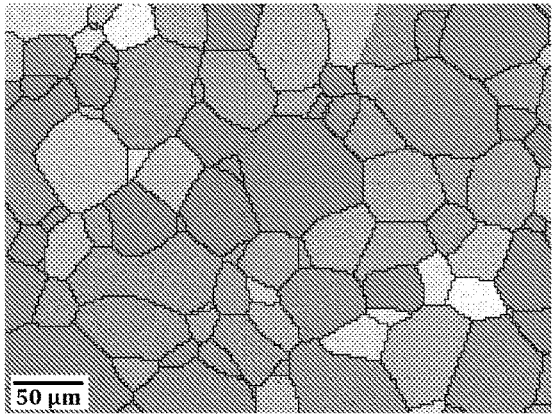

Of the alloys set out in Table 1, FIG. 1 shows at (a) the microstructure obtained with the alloy of the invention and at (b) the first Beta-C alloy, in each case after subjecting the alloy to homogenizing heat treatment. A comparison of the microstructures readily shows the beta grain size to be markedly smaller, shown to be by an order of magnitude in FIG. 1, in the alloy of the invention than that obtained in the standard Beta-C alloy. Calculations based on measurement of the 2D and 3D volume fractions of $Ti_2C$ in the alloy of the invention showed that, despite the high carbon content compared with the Beta-C alloy, the alloy of the invention still had an estimated 0.0935 wt. % carbon in solution.

TABLE 1

| | O | N | H | C | Al | V | Cr | Mo | Zr | Fe | Si | Y | Ti |
|---|---|---|---|---|---|---|---|---|---|---|---|---|---|
| 1st BetaC, 20 mm bar | 0.119 | 0.01 | 0.0042 | 0.023 | 3.56 | 8.09 | 6.09 | 4.01 | 4.15 | 0.081 | 0.037 | <.0005 | Balance |
| 2nd BetaC, 17.5 mm bar, cold-forged | 0.082 | 0.021 | 0.0072 | 0.014 | 3.363 | 7.81 | 5.66 | 3.88 | 4.03 | 0.069 | 0.028 | <.0005 | Balance |
| Invention 20 mm bar, cold-drawn | 0.202 | 0.019 | 0.0043 | 0.101 | 3.39 | 7.77 | 6.05 | 3.93 | 3.88 | 0.053 | 0.035 | <.0005 | Balance |
| Element | O | N | H | C | Al | V | Cr | Mo | Zr | Fe | Si | Y | Ti |

Figure 2:
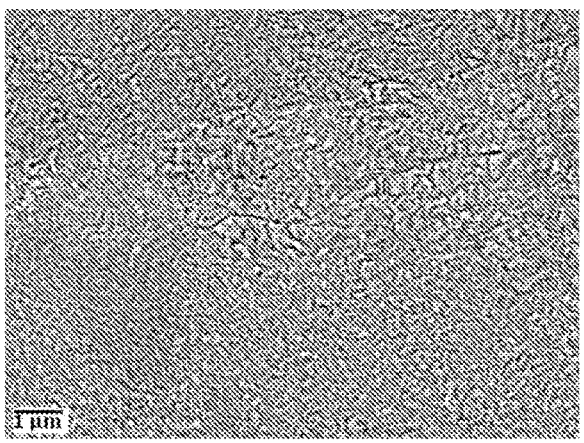
FIG. 2 provides micrographs showing the grain boundary alpha phase of (a) the titanium alloy of FIG. 1 compared to that of (b) the standard Beta-C alloy.
Figure 2:
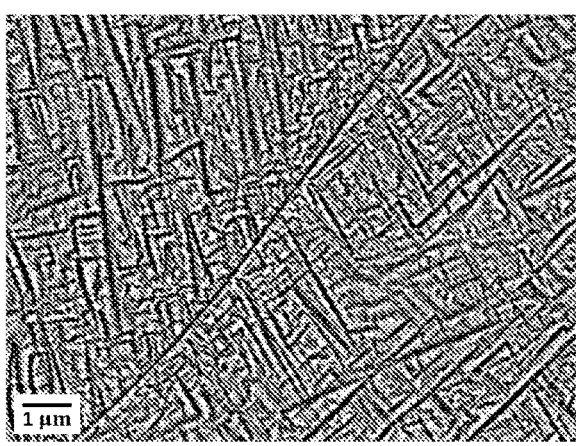

At higher magnification, FIG. 2 provides a comparison of the respective effect of carbon for the alloy of the invention of Table 1, shown at (a), and for the second Beta-C alloy of Table 1, shown at (b). Whereas the Beta-C alloy clearly exhibits grain boundary α-phase, very little α-phase is evident in the modified alloy of the invention.

Titanium rods from the alloys of Table 1 were processed either warm-drawn or cold-drawn to a diameter close to the required fastener size, followed by a surface cleaning, as appropriate, such as straightening, peeling, machining and surface cleaning. The drawn rods then were subjected to optimized post heat treatment, such as detailed below, to achieve the optimum mechanical properties. The added carbon of the alloy according to the present invention was found to improve ageing response and hardenability substantially through precipitation hardening of the β-phase by accelerated precipitation of α-phase. It appears that the higher carbon content of the alloy of the invention may facilitate the accelerated α-phase precipitation by relaxing the cooling rate required for precipitation on cooling from a β transus temperature, as a consequence of the TTT curves being moved slightly in the direction of increasing carbon content.

In general it is found with the alloys of the present invention that, after ageing treatment, the alpha precipitates were homogeneous and fine within the beta matrix phase, while grain boundary alpha phase which exist typically in titanium alloys was found to be substantially eliminated. It also was found that, at the levels required by the invention, the carbon increases the tolerance of the alloys to oxygen. For standard aerospace titanium alloys the upper limit for oxygen content is 2000 ppm but, with added carbon at the levels of total carbon allowed by the present invention, the alloy of the invention is able to tolerate oxygen up to 3000 ppm without a reduction in ductility.

The optimum post heat treatment condition is direct aging at a furnace temperature of from about 440° C. to about 540° C. for a period of time ranging from about 1 hour to about 12 hours. Carbon is recognized as an alpha phase stabilizer in titanium alloys, but usually at a significantly higher concentration than allowed by the present invention. At the total carbon level required by the present invention, the heat treatment is believed to drive a mechanism by which the added carbon works as precursor to alpha precipitation at an atomic level. This is similar to the role of carbon as an alpha phase stabilizer. As indicated, the added carbon of the invention diminishes grain boundary alpha phase, firstly because alpha particles precipitated within the beta phase are of reduced size and uniform. Secondly, while oxygen has a large affinity to the alpha phase in titanium alloys in general, the fine and uniform alpha phase that precipitates within the beta phase in the alloy of the invention forms under the carbon assistance, attracting the oxygen which tends to segregate at grain boundaries and small enough to diffuse, and diffuse into the fine and uniformly distributed alpha phase. The removal of oxygen segregation at grain boundaries leads to the elimination of the driving force for grain boundary alpha, as is evident from FIG. 2, and holds the key to the significant improvement in the fatigue strength in threaded regions.

The typical tensile and shear properties of the alloy set out in Table 1, derived from drawn rod of 20 mm diameter finish, are an ultimate tensile strength of 1518 MPa, elongation of 9% and double shear strength of 829 MPa. For a 10 mm diameter drawn rod, that reaches ultimate tensile strength of about 1500 MPa, elongation of 12% and double shear strength of 824 MPa. The notched- or threaded-fatigue properties of the alloy post treated material are shown in Table 2, as well as those properties for each of the $1^{st}$ Beta-C alloy set out in Table 1 and for Ti64 alloy detailed in Table 3. In each case the testing was conducted on 10 mm diameter samples each formed with rolled threads, as used in standard titanium fasteners. The requirement stated in the standard for aerospace fastener is 65,000 cycles at the stress of 38% UTS of the material. The fatigue-fracture surfaces of standard Beta-C typically contain significant amount intergranular failure, which leads to unpredictability and a potentially large variation in fatigue life. In contrast the fatigue-fracture surface of the invention alloy is dominated by ductile failure, with little intergranular failure, and this is indicative of consistent and reliable fatigue performance of the material, with a narrow scatter band for mechanical properties.

TABLE 2

Threaded-Fatigue Life Comparison of Typical Ti Fasteners of M10 Diameter

| | Maximum Stress (MPa) | R ratio | Life (cycles) |
| --- | --- | --- | --- |
| Beta C + Carbon | 521 | 0.1 | 760,000 |
| Standard Beta C | 471 | 0.1 | Discontinue at 130,000 |
| Ti64 | 440 | 0.1 | 130,000 |

TABLE 3

Composition of Ti—4V—6Al

| Element | min | max |
| --- | --- | --- |
| Aluminum | 5.50 | 6.75 |
| Vanadium | 3.50 | 4.50 |
| Iron | — | 0.30 |
| Oxygen | — | 0.20 |
| Carbon | — | 0.08 |
| Nitrogen | — | 0.05 (500 ppm) |
| Hydrogen (3.1.3); (3.1.1) | — | 0.0125 (125 ppm) |
| Yttrium (3.1.2) | — | 0.005 (50 ppm) |
| Other Elements, each (3.1.2) | — | 0.10 |
| Other Elements, total (3.1.2) | — | 0.40 |
| Titanium | remainder | |

From the foregoing description it will be appreciated that the level of total carbon required in the alloy of the invention both speeds up and refines α-phase precipitation, while also substantially avoiding grain boundary α-phase. Suitably heat treated fasteners produced from the alloy of the invention exhibit enhanced tensile, double shear and fatigue properties compared to existing Ti64 fasteners and also standard Beta-C fasteners. To illustrate this, it is reported that the Boeing 787 aircraft is assembled using 2.4 million fasteners, with 22% of these being structural bolts that mainly are titanium, believed to be Ti64, with the rest being rivets. It is estimated that replacing the current Ti64 fasteners with fasteners of the alloy of the invention would provide a weight reduction of at least 20%, representing a weight saving of from about 6,000 to 7,500 kg.

The alloy of the invention can also be atomised to produce powder for using in 3D printing or processed using conventional forging and casting. The above mechanism underpinning the improvement on the broad range of mechanical properties of this alloy will be retained in all those forms of the material.

REFERENCES

1. Z. Q. Chen, D. Hu, M. H. Loretto and Xinhua Wu, "Effect of carbon additions on microstructure and mechanical properties of Ti-15-3", *J. Mat. Sci & Tech.*, Vol 20, 2004, pp 343-349.
2. Z. Q. Chen, D. Hu, M. H. Loretto and Xinhua Wu, "Influence of 0.2 wt-% C on the aging response of Ti-15-3", *J. Mat. Sci & Tech*, Vol 20, 2004, pp 756-764.
3. M. Chu, Xinhua Wu, I. P. Jones and M. H. Loretto, "Influence of carbon on aging response and tensile properties of eutectoid beta titanium alloy Ti-13Cr", *J. Mat. Sci. & Tech*. Vol 22, No 6, 2006, pp 661-666.
4. M. Chu, Xinhua Wu, I. P. Jones, M H Loretto, "Effect of Carbon on Microstructure and Mechanical Properties of a Eutectoid Beta Titanium Alloy", *Rare Metal Materials and Engineering* Vol. 35, suppl. 1 Feb. 2006, pp 220-224.
5. D Hu, A J Huang, XP Song and Xinhua Wu, "Precipitation in carbon-doped Ti-15V-3Cr-3Sn-3Al", *Rare Metal Materials and Engineering* Vol. 35, suppl. 1 Feb. 2006, pp 225-229.
6. Xinhua Wu, J. del Prado, Q. Li, A. Huang, D. Hu and M. H. Loretto, "Analytical Electron Microscopy of C-free and C-containing Ti-15-3", *Acta Materialia*, Vol 54, Issue 20, 2006, pp 5433-5448.

The invention claimed is:

1. A meta-stable β titanium alloy comprising
7.5 to 8.5 wt. % vanadium,
5.5 to 6.5 wt. % chromium,
3.5 to 4.5 wt. % molybdenum,
3.5 to 4.5 wt. % zirconium,
3 to 4 wt. % aluminum,
up to 0.30 wt. % oxygen,
a maximum of 0.3 wt. % iron,
nitrogen up to 0.03 wt. %,
hydrogen up to 0.03 wt. %,
a maximum of 50 ppm yttrium,
a maximum of other elements comprising unavoidable impurities present at 0.15 wt. % each and 0.40 wt. % in aggregate,
with a balance (apart from carbon) of titanium;
the alloy having carbon present at a stable total carbon level sufficiently in excess of 0.05 wt. % achieving an improvement in the mechanical properties of ultimate tensile strength (UTS), double shear strength (DSS) and fatigue strength in threaded regions relative to standard Beta-C alloy with a specified carbon level below 0.05 wt. %, with a maximum stable total carbon content of 0.2 wt. %, the stable carbon comprising carbon in solid solution and thereby controlled so as to preclude carbide formation having a detrimental effect on the level of fatigue strength,
wherein, when drawn as a 10 mm to 20 mm rod, the titanium alloy exhibits one or more of: a UTS of about 1500 MPa or more, an elongation of about 9% or more, or a DSS of about 824 MPa or more.

2. The titanium alloy of claim 1, wherein the total carbon level comprises carbon impurities and added carbon.

3. The titanium alloy of claim 2, wherein the alloy is produced from a quantity of melted standard Beta-C alloy and the added carbon.

4. The titanium alloy of claim 1, wherein total carbon is present to a stable content of from 0.065 wt. % to 0.2 wt %.

5. The titanium alloy of claim 1, wherein total carbon is present to a stable content of from 0.070 wt. % to 0.2 wt %.

6. The titanium alloy of claim 1, wherein total carbon is present to a stable content of from 0.070 wt. % to 0.15 wt %.

7. The titanium alloy of claim 1, wherein total carbon is present to a stable content of from 0.070 wt. % to 0.08 wt %.

8. The titanium alloy of claim 1, wherein total carbon is present to a stable content of 0.080 wt. %.

9. The titanium alloy of claim 1, wherein the total carbon is retained in solid solution in predominant beta phase of the alloy, following cooling from an elevated solution heat treatment regime, rather than as carbide precipitate in the beta phase as a consequence of such cooling.

10. The titanium alloy of claim 1, wherein the titanium alloy is fabricated into titanium fasteners by subjecting the alloy to a homogenizing heat treatment before being fabricated to a required fastener form, such as by drawing.

11. The titanium alloy of claim 10, wherein the fasteners are subjected to a post heat treatment by direct aging at a furnace temperature of from 440° C. to 540° C. for a period of time ranging from 1 hour to 12 hours.

12. A titanium alloy, comprising:
7.5 to 8.5 wt % vanadium;
5.5 to 6.5 wt % chromium;
3.5 to 4.5 wt % molybdenum;
3.5 to 4.5 wt % zirconium;
3 to 4 wt % aluminum;
up to 0.3 wt % oxygen;
up to 0.3 wt % iron;
up to 0.03 wt % nitrogen;
up to 0.03 wt % hydrogen;
up to 55 ppm yttrium;
additional elements present in an amount up to 0.15 wt % each and 0.40 wt % in aggregate;
greater than 0.05 wt % to 0.2 wt % stable carbon, the stable carbon comprising carbon in solid solution and thereby controlled so as to preclude carbide formation having a detrimental effect on a level of fatigue strength; and
a balance of titanium,
wherein the titanium alloy is a meta-stable β titanium alloy, and
wherein the titanium alloy comprises a threaded fatigue strength relatively greater than a threaded fatigue strength of a standard Beta-C alloy comprising carbon in an amount less than 0.05 wt %,
wherein, when drawn as a 10 mm to 20 mm rod, the titanium alloy exhibits one or more of: a UTS of about 1500 MPa or more, an elongation of about 9% or more, or a DSS of about 824 MPa or more.

13. The titanium alloy of claim 12, wherein the threaded fatigue strength is at least 10% greater than the threaded fatigue strength of the standard Beta-C alloy.

14. The titanium alloy of claim 12, wherein the threaded fatigue strength is at least 10% greater than a threaded fatigue strength of Ti-6Al-4V (Ti-64).

15. The titanium alloy of claim 14, wherein the threaded fatigue strength is at least 18% greater than the threaded fatigue strength of Ti-6Al-4V (Ti-64).

16. The titanium alloy of claim 12, wherein the titanium alloy does not exhibit grain boundary alpha phases.

17. The titanium alloy of claim 12, wherein the titanium alloy is homogenously heat treated.

18. The titanium alloy of claim 12, wherein the titanium alloy consists essentially of vanadium, chromium, molybdenum, zirconium, aluminum, oxygen, iron, nitrogen, hydrogen, yttrium, the additional elements, stable carbon, and titanium.

19. The titanium alloy of claim 12, wherein the titanium alloy consists of vanadium, chromium, molybdenum, zirconium, aluminum, oxygen, iron, nitrogen, hydrogen, yttrium, the additional elements, stable carbon, and titanium.

\* \* \* \* \*